(12) United States Patent
Wurtenberger et al.

(10) Patent No.: US 9,072,009 B1
(45) Date of Patent: Jun. 30, 2015

(54) CARRIER SELECTION BASED ON PROBABLE MOBILITY OF PACKET FLOW

(75) Inventors: Andrew M. Wurtenberger, Olathe, KS (US); Rajveen Narendran, Olathe, KS (US); Joseph I. Schield, Lee's Summit, MO (US); Bret D. Vondemkamp, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2108 days.

(21) Appl. No.: 11/532,407

(22) Filed: Sep. 15, 2006

(51) Int. Cl.
*H04W 36/00* (2009.01)
*H04W 84/04* (2009.01)

(52) U.S. Cl.
CPC .......... *H04W 36/00* (2013.01); *H04W 36/0083* (2013.01); *H04W 84/045* (2013.01)

(58) Field of Classification Search
CPC .............. H04W 84/045; H04W 36/04; H04W 36/0083
USPC ............................ 455/444, 453, 524; 370/331
See application file for complete search history.

(56) References Cited

U.S. PATENT DOCUMENTS

| | | | |
|---|---|---|---|
| 5,790,528 A | 8/1998 | Muszynski | |
| 5,828,661 A | 10/1998 | Weaver, Jr. et al. | |
| 5,901,145 A | 5/1999 | Sawyer | |
| 5,987,013 A | 11/1999 | Kabasawa | |
| 6,011,971 A | 1/2000 | Jolma | |
| 6,069,871 A * | 5/2000 | Sharma et al. | 370/209 |
| 6,075,990 A | 6/2000 | Shin | |
| 6,111,864 A | 8/2000 | Kabasawa | |
| 6,134,220 A | 10/2000 | Le Strat et al. | |
| 6,230,013 B1 | 5/2001 | Wallentin et al. | |
| 6,289,221 B1 | 9/2001 | Ritter | |
| 6,542,484 B1 | 4/2003 | Ovesjo et al. | |
| 6,567,670 B1 | 5/2003 | Petersson | |
| 6,714,789 B1 | 3/2004 | Oh et al. | |
| 6,728,528 B1 | 4/2004 | Loke | |
| 6,944,147 B2 | 9/2005 | Chheda | |
| 6,980,805 B2 | 12/2005 | Matsumoto et al. | |
| 6,980,811 B2 | 12/2005 | Harris | |
| 7,082,305 B2 | 7/2006 | Willars et al. | |
| 7,096,019 B2 | 8/2006 | Wang | |
| 7,145,890 B1 | 12/2006 | Seo et al. | |
| 7,177,658 B2 | 2/2007 | Willenegger et al. | |
| 7,233,797 B2 | 6/2007 | Kanagawa | |
| 7,349,699 B1 * | 3/2008 | Kelly et al. | 455/444 |

(Continued)

OTHER PUBLICATIONS

Unpublished U.S. Appl. No. 11/535,870, entitled "Carrier Selection Based on Type of Packet Flow," filed Sep. 27, 2006 in the name of inventor Bret D. Vondemkamp et al.

(Continued)

*Primary Examiner* — Patrick Edouard
*Assistant Examiner* — Michael Irace

(57) ABSTRACT

Methods and systems are provided for carrier selection based on probable mobility of packet flow. A request is received from an access terminal. The request comprises a packet-flow-type indication, and indicates that the access terminal is requesting a packet flow. If the packet-flow-type indication is associated with a high degree of mobility, the first access terminal is instructed to conduct the packet flow on one of a first set of one or more carriers. If the packet-flow-type indication is associated with a low degree of mobility, the access terminal is instructed to conduct the packet flow on one of a second set of one or more carriers. No carriers are elements of both the first set and the second set.

16 Claims, 4 Drawing Sheets

| | PROFILE ID | MOBILITY |
|---|---|---|
| 201 | PROFILE_ID_1 | HIGH |
| 202 | PROFILE_ID_2 | LOW |
| 203 | PROFILE_ID_3 | HIGH |
| 204 | PROFILE_ID_4 | HIGH |
| 205 | PROFILE_ID_5 | LOW |

CORRELATION DATA 200

(56) References Cited

U.S. PATENT DOCUMENTS

| | | |
|---|---|---|
| 7,505,438 B2 | 3/2009 | Tayloe et al. |
| 7,505,439 B2 | 3/2009 | Chiang et al. |
| 7,519,026 B1 | 4/2009 | Oh |
| 7,548,751 B2 | 6/2009 | Katori et al. |
| 7,558,575 B2 | 7/2009 | Losh et al. |
| 7,978,674 B1 | 7/2011 | Oroskar et al. |
| 8,521,168 B1 | 8/2013 | Sigg et al. |
| 2003/0083072 A1 | 5/2003 | Mostafa |
| 2004/0037264 A1 | 2/2004 | Khawand |
| 2004/0120290 A1 | 6/2004 | Makhijani et al. |
| 2004/0125768 A1* | 7/2004 | Yoon et al. ............... 370/331 |
| 2004/0192315 A1 | 9/2004 | Li et al. |
| 2005/0026614 A1 | 2/2005 | Otsuka et al. |
| 2005/0059397 A1* | 3/2005 | Zhao ..................... 455/435.2 |
| 2006/0014544 A1* | 1/2006 | Tolli ........................ 455/453 |
| 2006/0019665 A1* | 1/2006 | Aghvami et al. ......... 455/444 |
| 2006/0142051 A1* | 6/2006 | Purnadi et al. ........ 455/552.1 |
| 2006/0160551 A1 | 7/2006 | Matoba et al. |
| 2007/0053336 A1 | 3/2007 | Petrovic et al. |
| 2009/0016328 A1* | 1/2009 | Peisa et al. ............... 370/352 |
| 2010/0278137 A1 | 11/2010 | Kwon et al. |

OTHER PUBLICATIONS

Non-Final Office Action from U.S. Appl. No. 11/535,870, mailed Apr. 3, 2009.

Advisory Action from U.S. Appl. No. 11/535,870, mailed Feb. 18, 2010.

Final Office Action from U.S. Appl. No. 11/535,870, mailed Nov. 12, 2009.

Final Office Action from U.S. Appl. No. 11/535,870, mailed Nov. 23, 2010.

Advisory Action from U.S. Appl. No. 11/535,870, mailed Feb. 14, 2011.

Notice of Allowance from U.S. Appl. No. 11/535,870, mailed Aug. 5, 2011.

Office action from U.S. Appl. No. 13/085,893, dated Dec. 17, 2012.

Notice of allowance from U.S. Appl. No. 13/085,893, dated Apr. 16, 2013.

Notice of Allowance mailed Nov. 14, 2011 for U.S. Appl. No. 11/535,870.

* cited by examiner

CARRIER SELECTION BASED ON PROBABLE MOBILITY OF PACKET FLOW

BACKGROUND

1. Technical Field

The present invention relates to wireless communications, and, more particularly, to managing mobility of mobile stations.

2. Description of Related Art

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which includes one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

In addition to VoIP communication, access terminals frequently engage in other types of packet-data communication, such as instant messaging (IM) and web browsing. Each instance of an access terminal engaging in a type of packet-data communication for a period of time may be deemed a "packet flow," which would typically involve Internet Protocol (IP) packets being sent and received by the access terminal. For example, a given VoIP call may be referred to as a VoIP packet flow. Thus, as examples, an access terminal may engage in VoIP packet flows, IM packet flows, push-to-talk (PTT) packet flows, streaming-video packet flows, streaming-audio packet flows, video-telephony packet flows, and best-effort packet flows such as web-browsing packet flows and file-transfer-protocol (FTP) packet flows.

To address the fact that access terminals engage in these various types of packet flows, a particular revision of EV-DO specifications, known as EV-DO Rev. A ("EV-DO-A"), provides for what are known as profile IDs, which are identifiers associated on a one-to-one basis with types of packet flows. Thus, one profile ID may be associated with VoIP packet flows (i.e., "conversational voice"), while another may be associated with best-effort packet flows, and so on. Again, an access terminal may be able to communicate according to more than one profile ID, reflecting that it can engage in more than one type of packet flow.

To initiate connectivity, perhaps when powered on in a coverage area of an access node, an access terminal may send what is known as a Universal Access Terminal Identifier (UATI) request to the access node. The access node may respond by granting a UATI to the access terminal in a message known as a UATI response. This UATI response typically contains the granted UATI, which then serves to identify the access terminal to the access node for some period of time.

After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in communication via the access node. Another such action is to set up a radio-packet (e.g., A10/A11) connection between the access node and the PDSN on behalf of the access terminal. The access node also facilitates establishment of a data link (e.g., a point-to-point protocol (PPP) connection) between the access terminal and the PDSN. The access node may also facilitate assignment (e.g., by the PDSN or by a Mobile-IP home agent) of an IP address to the access terminal. Finally, the access terminal and the access node negotiate over the traffic channel to agree on a set of profile IDs for the access terminal to use during the session; in other words, they agree as to the types of packet flows in which the access terminal is capable of engaging and in which the access terminal is permitted to engage.

Once those steps are complete, the access terminal has a session with the access node, and can therefore communicate over the packet-data network via the access node and the PDSN, according to the agreed-upon set of profile IDs. Typically, the air-interface connection is then torn down, freeing up those resources for other access terminals. Both the network and the access terminal maintain data pertaining to the rest of what was established, however, including the radio-packet connection, data link and IP address. The transition from having a traffic channel to not having one is referred to as the access terminal going from active to dormant.

Thereafter, if the access terminal wants to initiate packet-data communication, it will send another connection request to the access node, which will again assign a traffic channel to the access terminal. If, on the other hand, the access node receives data addressed to the access terminal, the access node would typically send a page to the access terminal over a common paging channel, which takes the form of certain timeslots on the forward link. Perhaps in that page, or in an ensuing message, the access node will assign a traffic channel to the access terminal. The access terminal can then engage in one or more packet flows of any of the negotiated types, over the packet-data network, using the assigned traffic channel, as well as the previously-established radio-packet connection, data link and IP address.

As part of setting up a packet flow, either the access terminal or the access node, or both, may send the other a message known as a ReservationOnRequest (RoR). The RoR includes at least one profile ID, which indicates the type of packet flow that is being requested. Once an RoR has been sent and acknowledged, the access terminal has an "open reservation" on the assigned traffic channel. This open reservation is associated with the profile ID that was included in the RoR; in other words, the open reservation is associated with the type of packet flow in which the access terminal is then able to engage. Note that an access terminal may have more than one open reservation on the assigned traffic channel at one time, corresponding to the fact that the access terminal can engage in more than one packet flow at one time.

The network typically uses this profile-ID information to apply a particular quality of service (QoS) to the packet flow, which essentially means providing a particular level of packet forwarding (or "expedited forwarding") treatment to certain packet flows. This traffic shaping is also known as "DiffServ" ("differentiated services"). Thus, a profile ID effectively represents a set of QoS characteristics to be applied to a packet flow.

Note that an access node may, in a coverage area such as a cell or sector, provide service on one or more carrier frequencies ("carriers"). When service is provided on only one carrier, the access terminal will, by default, conduct its one or more packet flows on a traffic channel on that carrier. When service is provided on more than one carrier, the access node will select one of those carriers on which to assign a traffic channel to the access terminal. In general, each carrier may occupy a 1.25-MHz-wide band of the RF spectrum. Furthermore, a carrier may actually be a pair of 1.25-MHz-wide bands, in systems that use a frequency-division-duplex (FDD) approach, where access terminals receive on one frequency, and transmit on another.

A service provider may configure neighboring coverage areas to each provide service on at least a common carrier, referred to herein as a "base carrier." The service provider may also configure certain of those coverage areas to provide service on one or more additional carriers, referred to herein as "overlay carriers." In cases where an overlay carrier is implemented due to certain coverage areas frequently experiencing large volumes of users, the overlay carrier may also be referred to as a "capacity carrier," put in place to handle increased capacity.

As indicated by the general term "mobile stations," access terminals are often highly mobile. In situations where an access terminal moves from one coverage area to another, such as from one sector to another of a given RNC, or from a sector of a first RNC to a sector of a second RNC, the access terminal and the network typically cooperate to "handoff" the access terminal from one sector (known as a "source" sector) to the next (known as a "target" sector).

Handoffs where the access terminal communicates with both the source and target sectors using the same carrier—such as a base carrier—are known as "soft handoffs," and typically involve establishing a connection with the target sector before terminating the connection with the source sector, or "make before break." Conversely, handoffs where the access terminal communicates with the source and target sectors using different carriers—such as when the source sector is operating on an overlay carrier and the target sector is operating on a base carrier—are known as "hard handoffs," and typically involve terminating the connection with the source sector prior to establishing a connection with the target sector, or "break before make." Not surprisingly, hard handoffs result in dropped calls, delays, and other events that make for worse user experiences more frequently than do soft handoffs.

SUMMARY

Methods and systems are provided for carrier selection based on probable mobility of packet flow. An exemplary embodiment of the present invention may take the form of a method. In accordance with the method, a request is received from an access terminal. The request comprises a packet-flow-type indication, and indicates that the access terminal is requesting a packet flow. It is determined whether the packet-flow-type indication is associated with a high degree of mobility or rather with a low degree of mobility. If the packet-flow-type indication is associated with a high degree of mobility, the access terminal is instructed to conduct the first packet flow on one of a first set of one or more carriers. If the packet-flow-type indication is associated with a low degree of mobility, the access terminal is instructed to conduct the packet flow on one of a second set of one or more carriers. No carriers are elements of both the first set and the second set.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
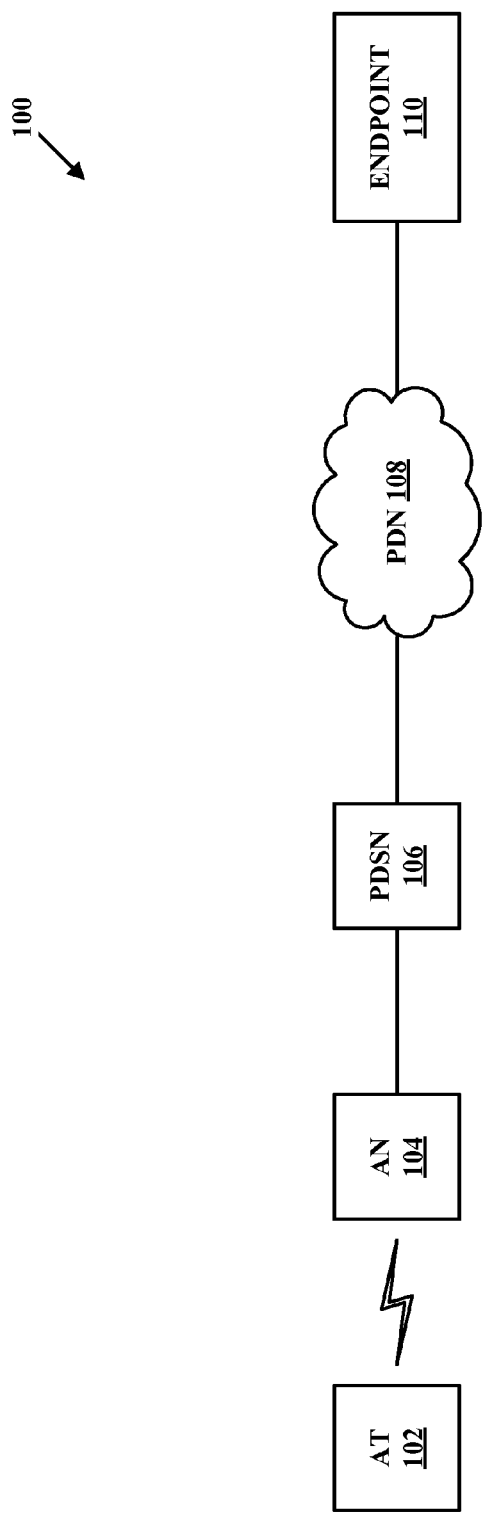
FIG. 1 is a simplified block diagram of a communication system, in accordance with exemplary embodiments.

Among other motivations and inspirations, the present invention springs from a desire to minimize hard handoffs for EV-DO access terminals, and from a realization that some types of packet flows conducted by access terminals generally correlate with a higher degree of user mobility than do others. For example, access terminals conducting VoIP packet flows tend to have a higher degree of mobility than access terminals conducting best-effort packet flows such as web-browsing.

This may reflect that users can do other things—such as walking or driving—while talking on the phone, whereas web browsing is not as conducive to such parallel activities.

Thus, a service provider may classify certain types of packet flows as being associated with a high degree of mobility, while classifying other types of packet flows as being associated with a low degree of mobility. The service provider may further configure its access nodes, perhaps specifically its RNCs, to store—or at least have access to—data that correlates different types of packet flows (i.e., different profile IDs) with either a high degree of mobility or rather with a low degree of mobility.

As such, when an access node receives a request—which may be an RoR, perhaps coupled with a connection request—from an access terminal that is seeking to engage in a packet flow with one or more other entities, the access node may examine that request and identify that it contains a profile ID that indicates the type of packet flow in which the access terminal would like to engage. In accordance with the present invention, the access node determines, perhaps with reference to correlation data such as that described above, whether that type of packet flow is associated with a high degree of mobility or rather with a low degree of mobility.

Furthermore, the access node provides EV-DO service to access terminals on more than one carrier in the relevant coverage area. If the access terminal is requesting a packet flow that is associated with a high degree of mobility, the access node instructs the access terminal to conduct that session on one of a first set of one or more carriers. If, on the other hand, the access terminal is requesting a packet flow that is associated with a low degree of mobility, the access node instructs the access terminal to conduct that packet flow on one of a second set of one or more carriers. Note that there are no carriers that are elements of both the first set and the second set. The access node may instruct the access terminal as to which carrier to use for the packet flow using a message such as a channel-assignment message.

Thus, access terminals that are engaged in similar types of packet flows will be grouped on the same carriers. This grouping may be beneficial for the service provider for at least the reason that it may increase the efficiency of the various carriers. In particular, the access node can implement a more efficient scheduling of access terminals onto particular timeslots on a given carrier when the access terminals using that carrier are engaging in similar types of packet flows. This is due to EV-DO having multiple different packet sizes and allowing for user traffic to be time-division multiplexed onto the forward-link waveform in many different ways.

For illustration, consider assigning VoIP packet flows to a first carrier and best-effort packet flows to a second carrier. VoIP packets are typically of a relatively small size, and thus many users' VoIP packets can be interleaved together on the forward link without any large packets in between, which will enhance the VoIP users' experience, since they will be receiving voice data more often, and more continuously. Best-effort data packets, such as HTTP packets, however, are typically of a larger size, and are much less time-critical than VoIP packets. Thus, EV-DO's larger packet sizes can be used to deliver more data at a given time to access terminals engaging in best-effort packet flows, enhancing those users' experience as well.

In a preferred embodiment, the one or more carriers making up the first set (used for highly-mobile packet flows such as VoIP) are base carriers and the one or more carriers making up the second set (used for less-mobile packet flows such as best effort) are overlay carriers. Thus, users who are engaged in higher-mobility packet flows, and are thus more likely to move from sector to sector, will be able to do so by making use of more-reliable soft handoffs on a base carrier. And users who are engaged in lower-mobility packet flows will be served perfectly well by an overlay carrier. With this arrangement, the frequency of hard handoffs in the network will decrease, and thus the rate of dropped packet flows (e.g., calls), delay, and other problems associated with hard handoffs will decrease as well, improving user experiences.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node (AN) 104, a PDSN 106, a packet-data network (PDN) 108, and an endpoint 110. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. As such, access terminal 102 may include a user interface, a wireless-communication interface, a processor, and data storage comprising instructions executable by the processor for carrying out the access-terminal functions described herein. The user interface may include buttons, a touch-screen, a microphone, and/or any other elements for receiving inputs from users, as well as a speaker, one or more displays, and/or any other elements for communicating outputs to users.

The wireless-communication interface may comprise an antenna and a chipset for communicating with one or more access nodes over an air interface. As an example, the chipset could be one suitable for engaging in EV-DO (or more specifically, EV-DO-A) communications. The chipset or wireless-communication interface in general may also be able to communicate with a CDMA network, a Wi-Fi (IEEE 802.11) network, and/or one or more additional types of wireless networks. The processor and data storage may be any suitable components known to those of skill in the art. As examples, access terminal 102 could be or include a cell phone, a personal digital assistant (PDA), a computer, a laptop computer, a hybrid IS-2000/IS-856 device, and a multi-mode Wi-Fi/cellular device.

Access node 104 may be any one or any combination of network elements arranged to carry out the access-node functions described herein. As such, access node 104 may include a communication interface, a processor, and data storage comprising instructions executable by the processor to carry out the access-node functions described herein. The communication interface may include one or more antennas and chipsets or other components for providing one or more EV-DO coverage areas such as cells or sectors, for communicating with access terminals such as access terminal 102 over an air interface. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

Figure 2:
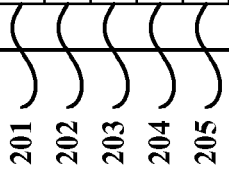
FIG. 2 is a simplified block diagram of correlation data, in accordance with exemplary embodiments.

Furthermore, access node 104 may store correlation data such as that depicted in FIG. 2. As shown in FIG. 2, correlation data 200 is depicted as a table having five rows, 201 through 205. Each row correlates a respective profile ID with either a high degree of mobility or rather with a low degree of mobility. Row 201 includes "PROFILE_ID_1" correlated with a high degree of mobility. Row 202 includes "PROFILE_ID_2" correlated with a low degree of mobility. Row 203 includes "PROFILE_ID_3" correlated with a high degree of mobility. Row 204 includes "PROFILE_ID_4" correlated with a high degree of mobility. Row 205 includes "PROFILE_ID_5" correlated with a low degree of mobility.

Returning to FIG. 1, PDSN 106 may be any networking server or other device arranged to carry out the PDSN functions described herein. As such, PDSN 106 may include a communication interface, a processor, and data storage comprising instructions executable by the processor for carrying out the PDSN functions described herein. The communication interface may include a wired packet-data interface such as an Ethernet interface for communicating with access node 104 and over PDN 108. Note that PDSN 106 may, instead or in addition, comprise a wireless-communication interface for communicating with access node 104 and over PDN 108. Note as well that PDSN 106 may use the same interface or separate interfaces for communicating with access node 104 and for communicating over PDN 108.

PDN 108 may be communicatively coupled with at least PDSN 106 and endpoint 110, and may include one or more wide area networks (WANs), one or more local area networks (LANs), one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

Endpoint 110 may be any device arranged to engage in one or more packet flows with access terminal 102 via PDN 108, PDSN 106, and access node 104, and to carry out the endpoint functions described herein. As such, endpoint 110 may include a communication interface, a processor, and data storage comprising instructions executable by the processor for carrying out the endpoint functions described herein. As examples, endpoint 110 could be or include a packet-based telephone, a computer, an access terminal, a cell phone, a PDA, a server (such as a call server, a VoIP server, a PTT server, a proxy (such as a Session Initiation Protocol (SIP) proxy)), and/or any other type of endpoint.

3. Exemplary Operation a. A First Exemplary Method

Figure 3:
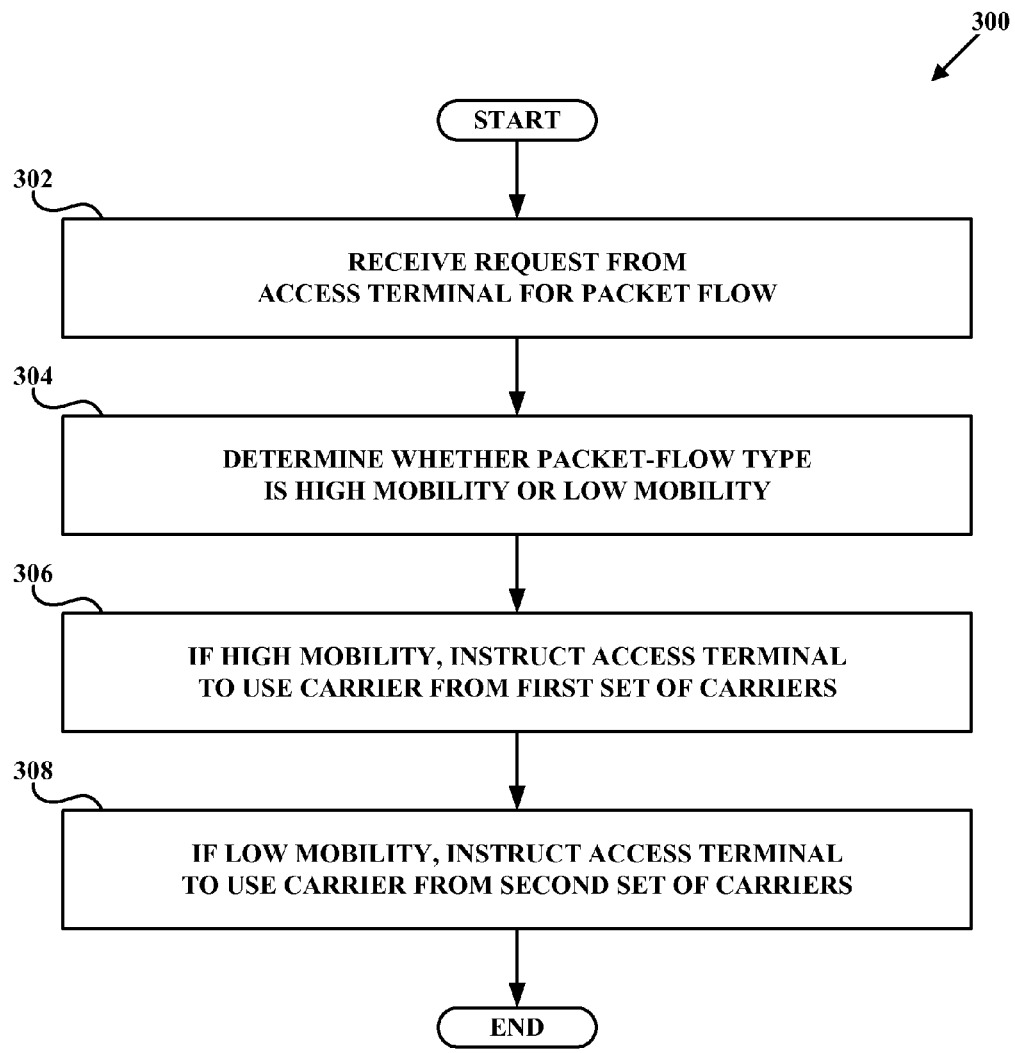
FIG. 3 is a flowchart of a method, in accordance with exemplary embodiments.

FIG. 3 depicts a flowchart of an exemplary method, in accordance with an exemplary embodiment. As shown in FIG. 3, a method 300 begins at step 302, when access node 104 receives a first request from access terminal 102. The first request includes a first packet-flow-type indication, and indicates that access terminal 102 is requesting a first packet flow. At step 304, access node 104 determines whether the first packet-flow-type indication is associated with a high degree of mobility or rather with a low degree of mobility.

At step 306, if the first packet-flow-type indication is associated with a high degree of mobility, access node 104 instructs access terminal 102 to conduct the first packet flow on one of a first set of one or more carriers. At step 308, if the first packet-flow-type indication is associated with a low degree of mobility, access node 104 instructs access terminal 102 to conduct the first packet flow on one of a second set of one or more carriers. No carriers are elements of both sets. These steps are further explained in the following subsections.

And it should be noted as a general matter that, although method 300 is described herein as being carried out by access node 104, this is not required. In some embodiments, method 300 may be carried out specifically by an RNC or BTS. In other embodiments, method 300 could be carried out by a server, a combination of more than one server, a gateway, a proxy, a BSC, a PDSN, some other network element, or perhaps some combination of these. And other possibilities exist as well.

i. Receive Packet-Flow Request from Access Terminal

At step 302, access node 104 receives a request from access terminal 102. The request could be or include a connection request, an RoR, and/or any other type of message. Whatever form the request takes, it will include a packet-flow-type indication, and indicate that access terminal 102 is requesting a packet flow. In a preferred embodiment, access terminal 102 and access node 104 communicate with each other according to EV-DO-A, and the packet-flow-type indication is a profile ID, as described herein.

Note that, as described, access terminal 102 and access node 104 would have negotiated to establish a set of profile IDs in which access terminal 102 is capable of engaging and permitted to engage. Access terminal 102 is then associated with one or more profile IDs. Thus, when the profile ID provided in the request of step 302 is in that negotiated set of profile IDs, access terminal 102 and access node 104 have effectively negotiated to establish that access terminal 102 is capable of engaging in—and permitted to engage in—the requested packet flow.

Note as well that the inclusion of a given profile ID in the request may itself be the indication that access terminal 102 is requesting a packet flow of that type. The request could, however, include another way of indicating that access terminal 102 is requesting a packet flow as a general matter. Furthermore, the packet-flow-type indication (e.g., profile ID) could indicate that the requested packet flow is of any type, some examples including a VoIP packet flow, a PTT packet flow, a high-performance push-to-talk (HPPTT) packet flow, a streaming-video packet flow, a streaming-audio packet flow, a video-telephony packet flow, a best-effort packet flow, a web-browsing packet flow, and an FTP packet flow.

ii. Determine High or Low Mobility

At step 304, access node 104 determines whether the packet-flow-type indication in the request of step 302 is associated with a high degree of mobility or rather with a low degree of mobility. In one embodiment, access node 104 may carry out step 304 at least in part by referencing correlation data—such as correlation data 200 of FIG. 2—that correlates each of a plurality of packet-flow types with either a high degree of mobility or a low degree of mobility. Thus, as an example, if the request of step 302 includes PROFILE_ID_1, access node 104 may reference row 201, and determine that PROFILE_ID_1 is associated with high mobility. As another example, if the request includes PROFILE_ID_5, access node 104 may reference row 205, and determine that PRO-FILE_ID_5 is associated with low mobility.

iii. If High Mobility, Assign Packet Flow to One of a First Set of Carriers

At step 306, if it is determined in step 304 that the packet-flow-type indication is associated with a high degree of mobility, access node 104 then instructs access terminal 102 to conduct the requested packet flow on one of a first set of one or more carriers. Access node 104 may so instruct access terminal 102 by sending a message, such as a channel-assignment message, to access terminal 102, where the channel-assignment message includes an indication of which carrier to use. In a preferred embodiment, the first set of one or more carriers from which access node 104 will pick when carrying out step 306 are base carriers, which means that wireless coverage areas (e.g., sectors) that are neighboring coverage areas to the coverage area in which access terminal 102 is currently operating would also provide service on those carriers.

iv. If Low Mobility, Assign Packet Flow to One of a Second Set of Carriers

At step 308, if it is determined in step 304 that the packet-flow-type indication is associated with a low degree of mobility, access node 104 then instructs access terminal 102 to conduct the requested packet flow on one of a second set of one or more carriers. Note that the first set of carriers and the second set of carriers are mutually exclusive: no carriers are elements of both the first set and the second set. Again, access node 104 may instruct access terminal 102 to use a given carrier by sending a message, such as a channel-assignment message, to access terminal 102.

In a preferred embodiment, the second set of one or more carriers from which access node 104 will pick when carrying out step 308 are overlay carriers, which means that wireless coverage areas (e.g., sectors) that are neighboring coverage areas to the coverage area in which access terminal 102 is currently operating could, but would not necessarily, also provide service on those carriers. In some embodiments, one or more of the overlay carriers in the second set of carriers could be capacity carriers, put into operation by a wireless-service provider to handle increased capacity that may arise from time to time in given coverage areas.

Note that, after carrying out method 300 with respect to access terminal 102, access node 104 may receive a request from some other access terminal, where that request includes a packet-flow-type indication and indicates that the other access terminal is requesting a second packet flow of the type indicated by the packet-flow-type indication. Access node 104 may responsively determine whether that packet-flow-type indication is associated with a high degree of mobility or rather with a low degree of mobility, perhaps in a manner similar to that described above with respect to step 304, or perhaps in some other manner.

Next, if that packet-flow-type indication is associated with a high degree of mobility, access node 104 may then instruct the other access terminal to conduct its packet flow on one of the first set of one or more carriers mentioned above in connection with step 306. If, on the other hand, that packet-flow-type indication is associated with a low degree of mobility, access node 104 may then instruct the other access terminal to conduct its packet flow on one of the second set of one or more carriers mentioned above in connection with step 308.

So imagine an example where the first set of carriers consists of one carrier, and that carrier is a base carrier. Further-more, in this example, the second set of carriers also consists of one carrier, different from the first carrier of course, where that carrier is an overlay carrier. If access terminal 102 and the other access terminal both request a VoIP packet flow using, say, PROFILE_ID_1, then both access terminals will be instructed to use the base carrier. If, on the other hand, both access terminals request a best-effort packet flow using, say, PROFILE_ID_5, then both access terminals will be instructed to use the overlay carrier.

If access terminal 102 requested a VoIP packet flow using PROFILE_ID_1 and was placed on the base carrier, while the other access terminal requested a best-effort packet flow using PROFILE_ID_5 and was placed on the overlay carrier, then each access terminal should be well served. Access terminal 102 can move to neighboring coverage areas and take advantage of soft handoffs on the base carrier, while the other access terminal will likely stay in its current coverage area, and be served perfectly well on the overlay carrier.

Note as a general matter that, in this and other embodiments, more than two degrees of mobility could be used in accordance with the present invention, and that two is provided by way of illustration. Correspondingly, more than two non-overlapping sets of carriers could be used. Furthermore, as explained, a given access terminal could engage in—and thus request—more than one type of packet flow. In that situation, in a preferred embodiment, the access terminal would be instructed to use a carrier from whichever set of one or more carriers corresponded to the most mobile of the packet-flow types requested.

b. A Second Exemplary Method

Figure 4:
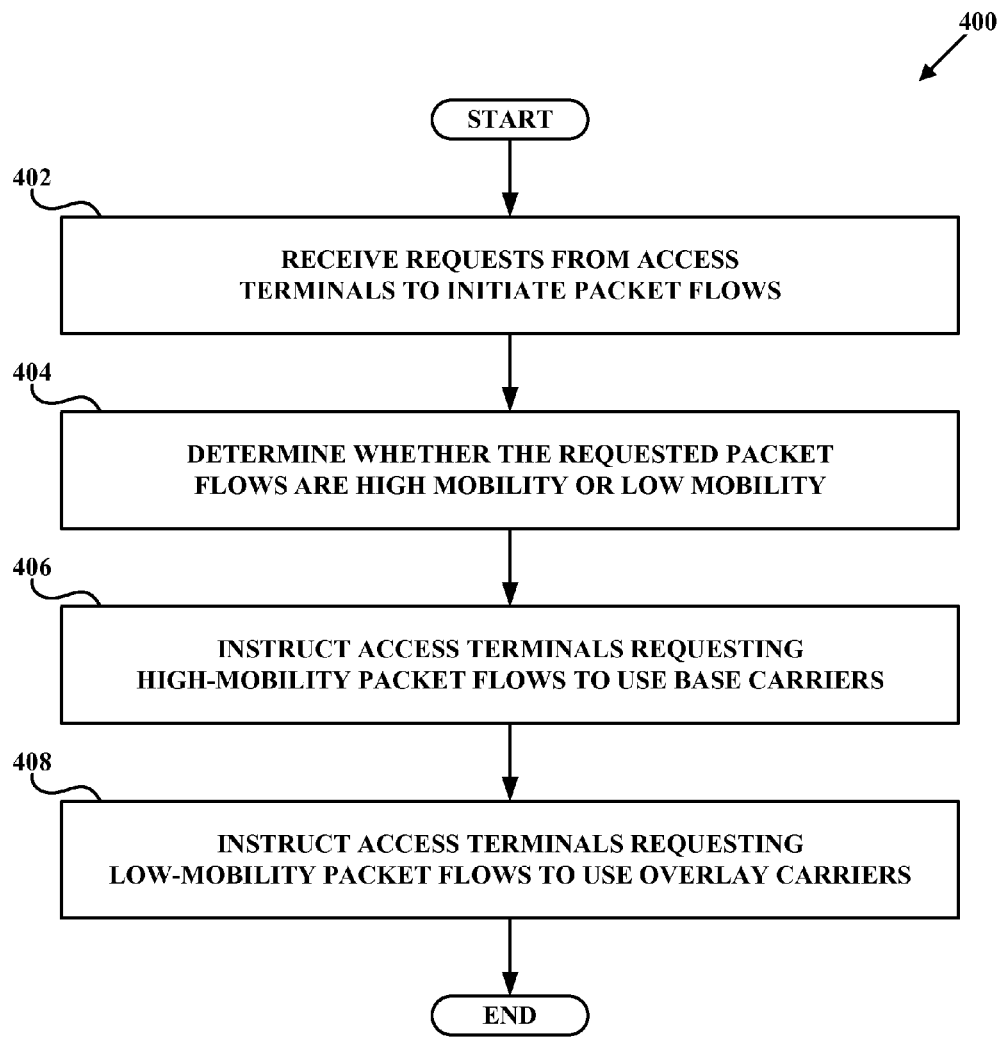
FIG. 4 is a flowchart of a method, in accordance with exemplary embodiments.

FIG. 4 is a flowchart of an exemplary method, in accordance with an exemplary embodiment. As with method 300 of FIG. 3, method 400 of FIG. 4 is described as being carried out by an access node, and by access node 104 of FIG. 1 in particular, though this is not required. Method 400 could be carried out by any one or any combination of the entities described as possibilities for method 300, and/or any other network entity or entities.

As shown in FIG. 4, a method 400 begins at step 402, when access node 104 receives, from access terminals such as access terminal 102, requests to initiate packet flows. These requests could be or include connection requests, RoRs, and/or any other type of messages according to any protocols now known or later developed. At step 404, access node 104 respectively determines whether the requested packet flows are of a type associated with a high degree of mobility or rather with a low degree of mobility. Access node 104 may carry out step 404 by referring, on a request-by-request basis, to correlation data such as correlation data 200.

At step 406, access node 104 respectively instructs, perhaps using channel-assignment messages, the access terminals requesting packet flows of a type associated with a high degree of mobility to conduct those packet flows on base carriers. At step 408, access node 104 respectively instructs, again perhaps using channel-assignment messages, the access terminals requesting packet flows of a type associated with a low degree of mobility to conduct those packet flows on overlay carriers. Thus, in accordance with method 400, the advantages described herein with respect to grouping high-mobility packet flows on one set of carriers (and on base carriers in particular) and low-mobility packet flows on another, non-overlapping set of carriers (and on overlay carriers in particular) may be realized.

4. Conclusion

Various exemplary embodiments have been described above. Those skilled in the art will understand, however, that changes and modifications may be made to those examples without departing from the scope of the claims.

What is claimed is:

1. A method comprising:

maintaining in data storage correlation data that correlates each of a plurality of packet-flow-type indications with either a high degree of mobility or a low degree of mobility;

receiving a first request from a first access terminal, the first request (a) comprising a first packet-flow-type indication and (b) indicating that the first access terminal is requesting a first packet flow;

determining, by referencing the correlation data, whether the first packet-flow-type indication is associated with a high degree of mobility or rather with a low degree of mobility;

if the first packet-flow-type indication is associated with a high degree of mobility, then instructing the first access terminal to conduct the first packet flow on a carrier from a first set of one or more carriers, wherein the first set consists of base carriers on which service is provided in a given wireless network; and if the first packet-flow-type indication is associated with a low degree of mobility, then instructing the first access terminal to conduct the first packet flow on a carrier from a second set of one or more carriers, wherein the second set consists of overlay carriers on which service is provided in the same given wireless network, and further wherein no carriers are elements of both the first set and the second set.

2. The method of claim 1, carried out by at least one of an Evolution Data Optimized (EV-DO) radio network controller (RNC), an EV-DO access node (AN), and an EV-DO base transceiver station (BTS).

3. The method of claim 1, wherein the first request comprises at least one of a connection request and a reservation on request (RoR).

4. The method of claim 1, wherein the first access terminal is a device selected from the group consisting of a cell phone, a personal digital assistant, a computer, a laptop computer, a hybrid IS-2000/IS-856 device, and a multi-mode Wi-Fi/cellular device.

5. The method of claim 1, wherein the first packet-flow-type indication is a profile ID.

6. The method of claim 5, wherein first access terminal is associated with more than one profile ID.

7. The method of claim 1, wherein the first packet-flow-type indication indicates that the first packet flow is of a type selected from the group consisting of a Voice over Internet Protocol (VoIP) packet flow, a push-to-talk (PTT) packet flow, a high-performance push-to-talk (HPPTT) packet flow, a streaming-video packet flow, a streaming-audio packet flow, a video-telephony packet flow, a best-effort packet flow, a web-browsing packet flow, and a file transfer protocol (FTP) packet flow.

8. The method of claim 1, wherein at least one of the overlay carriers is a capacity carrier.

9. The method of claim 1, wherein instructing the first access terminal to conduct the first packet flow on a given carrier comprises sending a channel-assignment message to the first access terminal, the channel-assignment message comprising an indication of the given carrier.

10. The method of claim 1, further comprising negotiating with the first access terminal to establish that the first access terminal is capable of engaging in the first packet flow and that the first access terminal is permitted to engage in the first packet flow.

11. The method of claim 1, further comprising:

receiving a second request from a second access terminal, the second request (a) comprising a second packet-flow-type indication and (b) indicating that the second access terminal is requesting a second packet flow;

determining whether the second packet-flow-type indication is associated with a high degree of mobility or rather with a low degree of mobility;

if the second packet-flow-type indication is associated with a high degree of mobility, then instructing the second access terminal to conduct the second packet flow on a carrier from the first set of one or more carriers; and if the second packet-flow-type indication is associated with a low degree of mobility, then instructing the second access terminal to conduct the second packet flow on a carrier from the second set of one or more carriers.

12. The method of claim 11, wherein the first packet-flow-type indication is equal to the second packet-flow-type indication, and wherein the method comprises instructing the first access terminal to conduct the first packet flow and the second access terminal to conduct the second packet flow on the same carrier.

13. An access node comprising:

a communication interface;

a processor; and data storage comprising instructions executable by the processor to:

maintain correlation data that correlates each of a plurality of packet-flow-type indications with either a high degree of mobility or a low degree of mobility;

receive a request from an access terminal, the request (a) comprising a packet-flow-type indication and (b) indicating that the access terminal is requesting a packet flow;

determine, by referencing the correlation data, whether the packet-flow-type indication is associated with a high degree of mobility or rather with a low degree of mobility;

if the packet-flow-type indication is associated with a high degree of mobility, then instruct the access terminal to conduct the packet flow on a carrier from a first set of one or more carriers, wherein the first set consists of base carriers on which service is provided in a given wireless network; and if the packet-flow-type indication is associated with a low degree of mobility, then instruct the access terminal to conduct the packet flow on a carrier from a second set of one or more carriers, wherein the second set consists of overlay carriers on which service is provided in the same given wireless network, and further wherein no carriers are elements of both the first set and the second set.

14. The access node of claim 13, wherein the packet-flow-type indication is a profile ID.

15. The access node of claim 13, wherein the packet-flow-type indication indicates that the packet flow is of a type selected from the group consisting of a Voice over Internet Protocol (VoIP) packet flow, a push-to-talk (PTT) packet flow, a high-performance push-to-talk (HPPTT) packet flow, a streaming-video packet flow, a streaming-audio packet flow, a video-telephony packet flow, a best-effort packet flow, a web-browsing packet flow, and a file transfer protocol (FTP) packet flow.

16. A method comprising:
maintaining in data storage correlation data that correlates each of a plurality of packet-flow-type indications with either a high degree of mobility or a low degree of mobility;
receiving, from access terminals, requests to initiate packet flows;
respectively determining, by referencing the correlation data, whether the requested packet flows are of a type associated with a high degree of mobility or rather with a low degree of mobility;
respectively instructing the access terminals requesting packet flows of a type associated with a high degree of mobility to conduct those packet flows on base carriers on which service is provided in a given wireless network; and
respectively instructing the access terminals requesting packet flows of a type associated with a low degree of mobility to conduct those packet flows on overlay carriers on which service is provided in the same given wireless network.

* * * * *